(12) United States Patent
Akbulut et al.

(10) Patent No.: US 10,133,639 B2
(45) Date of Patent: Nov. 20, 2018

(54) PRIVACY PROTECTION OF MEDIA FILES FOR AUTOMATIC CLOUD BACKUP SYSTEMS

(71) Applicant: International Business Machines Corporation, Armonk, NY (US)

(72) Inventors: Muhtar B. Akbulut, Waban, MA (US); Mario A. Maldari, Lyons, CO (US); David D. Taieb, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/040,203

(22) Filed: Feb. 10, 2016

(65) Prior Publication Data

US 2017/0228289 A1    Aug. 10, 2017

(51) Int. Cl.
*G06F 17/00* (2006.01)
*G06F 11/14* (2006.01)
*G06F 21/62* (2013.01)
*G06F 17/30* (2006.01)

(52) U.S. Cl.
CPC .... *G06F 11/1451* (2013.01); *G06F 17/30174* (2013.01); *G06F 21/6218* (2013.01); *G06F 2201/80* (2013.01)

(58) Field of Classification Search
CPC ............... G06F 19/322; G06F 19/3462; G06F 19/3487; G06F 19/366; G06F 21/88; G06F 17/30749
See application file for complete search history.

(56) References Cited

U.S. PATENT DOCUMENTS

| | | | |
|---|---|---|---|
| 5,586,247 A | 12/1996 | Yoshifuji et al. | |
| 5,659,614 A * | 8/1997 | Bailey, III | G06F 11/1451 707/999.001 |
| 6,157,931 A | 12/2000 | Cane et al. | |
| 6,289,462 B1 | 9/2001 | McNabb et al. | |
| 7,519,784 B2 | 4/2009 | Childs et al. | |
| 7,934,249 B2 | 4/2011 | Chan et al. | |
| 8,001,087 B1 | 8/2011 | Newstadt et al. | |
| 8,181,036 B1 | 5/2012 | Nachenberg | |
| 8,315,502 B2 | 11/2012 | Martch et al. | |
| 8,429,364 B1 | 4/2013 | Orcutt | |

(Continued)

FOREIGN PATENT DOCUMENTS

| | | |
|---|---|---|
| AU | 2009243525 A1 | 6/2011 |
| CN | 105262810 A | 1/2016 |

(Continued)

OTHER PUBLICATIONS

IBM, List of IBM Patents or Patent Applications Treated as Related, Appendix P, dated Dec. 18, 2015, 2 pages.

(Continued)

*Primary Examiner* — Truong Vo
(74) *Attorney, Agent, or Firm* — Reza Sarbakhsh (57) ABSTRACT

Backing up electronic data files excluding confidential data. An electronic trigger event for initiating a data backup operation is detected. Data files are identified for backup. One or more files, or parts of a file, are designated for exclusion from the backup process. The backup process initiates a backup operation of one or more files, excluding the designated files.

20 Claims, 8 Drawing Sheets

(56) References Cited

U.S. PATENT DOCUMENTS

| | | | |
|---|---|---|---|
| 8,433,726 | B2 | 4/2013 | Swanburg et al. |
| 8,484,737 | B1 | 7/2013 | Swift et al. |
| 8,554,736 | B2 | 10/2013 | Radon et al. |
| 8,745,523 | B2 | 6/2014 | McInerney et al. |
| 9,015,082 | B1 | 4/2015 | Jaiswal et al. |
| 9,111,181 | B2 | 8/2015 | Allen et al. |
| 9,128,948 | B1 | 9/2015 | Raorane |
| 9,251,473 | B2 | 2/2016 | Gamon et al. |
| 9,256,798 | B2 | 2/2016 | Walker et al. |
| 9,489,376 | B2 | 11/2016 | Thomason et al. |
| 2002/0049778 | A1 | 4/2002 | Bell et al. |
| 2007/0022145 | A1 | 1/2007 | Kavuri |
| 2007/0098019 | A1 | 5/2007 | Kelly et al. |
| 2007/0179926 | A1 | 8/2007 | Chiang |
| 2007/0203776 | A1 | 8/2007 | Austin et al. |
| 2008/0235299 | A1 | 9/2008 | Haselton et al. |
| 2008/0307175 | A1 | 12/2008 | Hart et al. |
| 2008/0307333 | A1* | 12/2008 | McInerney ......... G06F 11/1448 715/764 |
| 2009/0125570 | A1 | 5/2009 | Bailey et al. |
| 2010/0257142 | A1* | 10/2010 | Murphy ............. G06F 11/1453 707/681 |
| 2010/0280994 | A1 | 11/2010 | Radon et al. |
| 2010/0318812 | A1 | 12/2010 | Auradkar et al. |
| 2011/0043631 | A1 | 2/2011 | Marman et al. |
| 2011/0087690 | A1 | 4/2011 | Cairns |
| 2012/0226663 | A1 | 9/2012 | Valdez Kline et al. |
| 2013/0031595 | A1 | 1/2013 | Nevstruev et al. |
| 2013/0103645 | A1 | 4/2013 | Lao et al. |
| 2013/0104190 | A1 | 4/2013 | Simske et al. |
| 2013/0305101 | A1 | 11/2013 | Gupta et al. |
| 2013/0325809 | A1 | 12/2013 | Kim et al. |
| 2014/0149322 | A1 | 5/2014 | LaVoie et al. |
| 2014/0181012 | A1 | 6/2014 | Min et al. |
| 2014/0189803 | A1 | 7/2014 | Chakra et al. |
| 2014/0226909 | A1 | 8/2014 | Montalvo et al. |
| 2014/0297593 | A1 | 10/2014 | Baumann et al. |
| 2015/0032785 | A1 | 1/2015 | Itasaki et al. |
| 2015/0212896 | A1 | 7/2015 | Pawar et al. |
| 2015/0317208 | A1 | 11/2015 | Desantis et al. |
| 2015/0317511 | A1 | 11/2015 | Li et al. |
| 2016/0085631 | A1 | 3/2016 | Madiraju Varadaraju |
| 2016/0171239 | A1 | 6/2016 | Li et al. |

FOREIGN PATENT DOCUMENTS

| | | |
|---|---|---|
| GB | 2507094 A | 4/2014 |
| WO | 9835285 A3 | 11/1998 |
| WO | 2006011067 A2 | 2/2006 |
| WO | 2010030288 A1 | 3/2010 |
| WO | 2010126797 A1 | 11/2010 |
| WO | 2010144735 A2 | 12/2010 |
| WO | 2012012579 A1 | 1/2012 |
| WO | 2014167525 A1 | 10/2014 |

OTHER PUBLICATIONS

Pending U.S. Appl. No. 15/040,198, filed Feb. 10, 2016, Entitled: Privacy Protection of Media Files For Automatic Cloud Backup Systems.
Pending U.S. Appl. No. 15/040,208, filed Feb. 10, 2016, Entitled: Privacy Protection of Media Files For Automatic Cloud Backup Systems.
Squicciarini et al., "Adaptive Data Management for Self-Protecting Objects in Cloud Computing Systems", 2012, IFIP, pp. 140-144.
Sethuraman et al., "Data Loss/Leakage Prevention", Master's Thesis, Lulea University of Technology, Aug. 2012, 73 pages.
Content Analyst Company, Storage Management, "Automated Content-Based Classification of Unstructured Data for Enterprise Storage Management Solutions", www.contentanalyst.com, 2013, 4 pages.
Jayaram et al., "An Empirical Analysis of Similarity in Virtual Machine Images", Middleware 2011 Industry Track, Dec. 12, 2011, 6 pages.
Popp et al., "Countering Terrorism Through Information and Privacy Protection Technologies", Data Surveillance, IEEE Secuity and Privacy, 2006, pp. 24-33.
Sampaio et al., "Open Source Backup Systems for SME's", Advances in Intelligent Systems and Computing 353, pp. 823-832.
Mell et al., "The NIST Definition of Cloud Computing", National Institute of Standards and Technology, Special Publication 800-145, Sep. 2011, pp. 1-7.

* cited by examiner

PRIVACY PROTECTION OF MEDIA FILES FOR AUTOMATIC CLOUD BACKUP SYSTEMS

BACKGROUND

Embodiments of the invention generally relate to electronic data storage, and more particularly to managing data privacy in data storage systems.

New electronic data is constantly generated at a rapid pace in both the enterprise and consumer electronic spaces. In the consumer electronic space, for instance, users generate large volumes of electronic data in various file formats. On a personal mobile device such as a phone or a tablet, for example, a user sends and receives emails, text messages, voice messages, images, videos, and other data files.

A growing trend in data management is to backup the data, either manually, or on a regular basis according to a backup schedule. One motivation behind this trend is to provide a recovery solution in case of data loss, where if a primary storage device fails, or if the data is needed on a new device, the data may be recovered from a backup storage source. Another motivation is to provide data synchronization and sharing across multiple devices in concurrent or near-concurrent use.

Some service providers offer services to address the need for data recovery and synchronization. In one instance, data generated by or stored on a computing device, such as a mobile phone, is pushed to the cloud, where it is stored and made available for recovery in case of loss, and for data sharing across user devices. For example, a mobile device user snaps an image on the user's mobile phone using the phone's built-in camera. The mobile phone stores the image on its local storage, and additionally pushes the image to a cloud storage service, causing the image to be stored on a remote storage device operated by a cloud storage service provider.

SUMMARY

Embodiments of the invention provide for a method, system, and computer program product for identifying an electronic data file for exclusion from a data backup operation. For example the method identifies either or both of a first data file stored on an electronic file system, and a set of data elements within the first data file. Either or both of the first data file and the set of data elements within the first data file have at least one feature matching a predefined exclusion feature. The method designates either or both of the first data file and the set of data elements within the first data file for exclusion from a backup operation.

Embodiments of the invention provide for a method, system, and computer program product for backing up electronic data files. For example, the method detects an electronic trigger event for initiating a data backup operation and identifies a first electronic data file for backup based on the detection. The method determines that either or both of the first electronic data file and one or more data elements of the first electronic data file are designated for exclusion from the backup process, and initiates a backup operation of one or more data files excluding the first electronic data file.

Embodiments of the invention provide for a method, system, and computer program product for providing electronic image security on a mobile device. For example, the method identifies one or more data elements, in a first electronic image, having at least one feature matching a predefined exclusion feature, and designates the first electronic image for exclusion from a backup operation based on the identification.

DETAILED DESCRIPTION

Current data backup solutions have many limitations. One limitation is that data stored on a computing device is backed up indiscriminately according to an arbitrary selection of files and file directories, regardless of files' contents. Typically, a user selects the files and file directories to be backed up. The computing device backs up the selected files and directories according to either a user-initiated process, or according an automatic backup process that occurs from time to time, or upon certain conditions occurring. For example, automatic backups may occur every hour, or within some time after a change in a file or directory is detected. All of these processes ignore the content of the files and directories; once a file or directory is selected for backup, it is backed up indiscriminately regardless of its contents.

Indiscriminant backing up of a file regardless its contents can lead to serious consequences in case of a security breach. In the cloud storage context, users are especially at risk since they typically have no control over the security mechanisms that a cloud storage service provider employs. While users can take some precautions with respect to their personal devices, users are nevertheless left to trust, on faith, that the service providers will adequately safeguard their data once the data is backed up. As cloud storage services grow, so does the risk of a security breach. Alternatively, if users choose not to trust a cloud service provider with their most sensitive information, and wish to be more selective about the choice of data they want to have backed up, the users must engage in an onerous selection process that becomes increasingly impractical and tedious, if not impossible, given the number and volume of data that is generated every day.

Imagine the following illustrative examples. A user snaps hundreds of photographs a week on the user's phone. The user may wish to make some photos private and not to back them up on the cloud (because, for example, the photos may be targeted by hackers). With current technologies, the user has to choose: the convenience and speed of automatic backup of all photos, or the near-impossible task of sifting through hundreds of photos, possibly one at a time, and choosing which ones to back up and which ones to keep private on the user's phone.

In another example, a user generates hundreds of text files a week using data from a variety of sources. Some of these data may be appropriate for backup, while others may not. The user must manually curate these files to ensure that there is no cross-contamination between sensitive files that are not to be backed up, and ordinary files that should be backed up. The task can be impossible considering that each text file, on average, may be tens of pages long.

Accordingly, aspects of the disclosure provide a method, system, and computer program product for identifying an electronic data file, based on analysis of its contents, for exclusion from a data backup operation. Further aspects of the disclosure provide a method, system, and computer program product for backing up data files based on the analyzed content of such files. Additional aspects of the disclosure provide a method, system, and computer program product for electronic image security on a mobile device.

Figure 1:
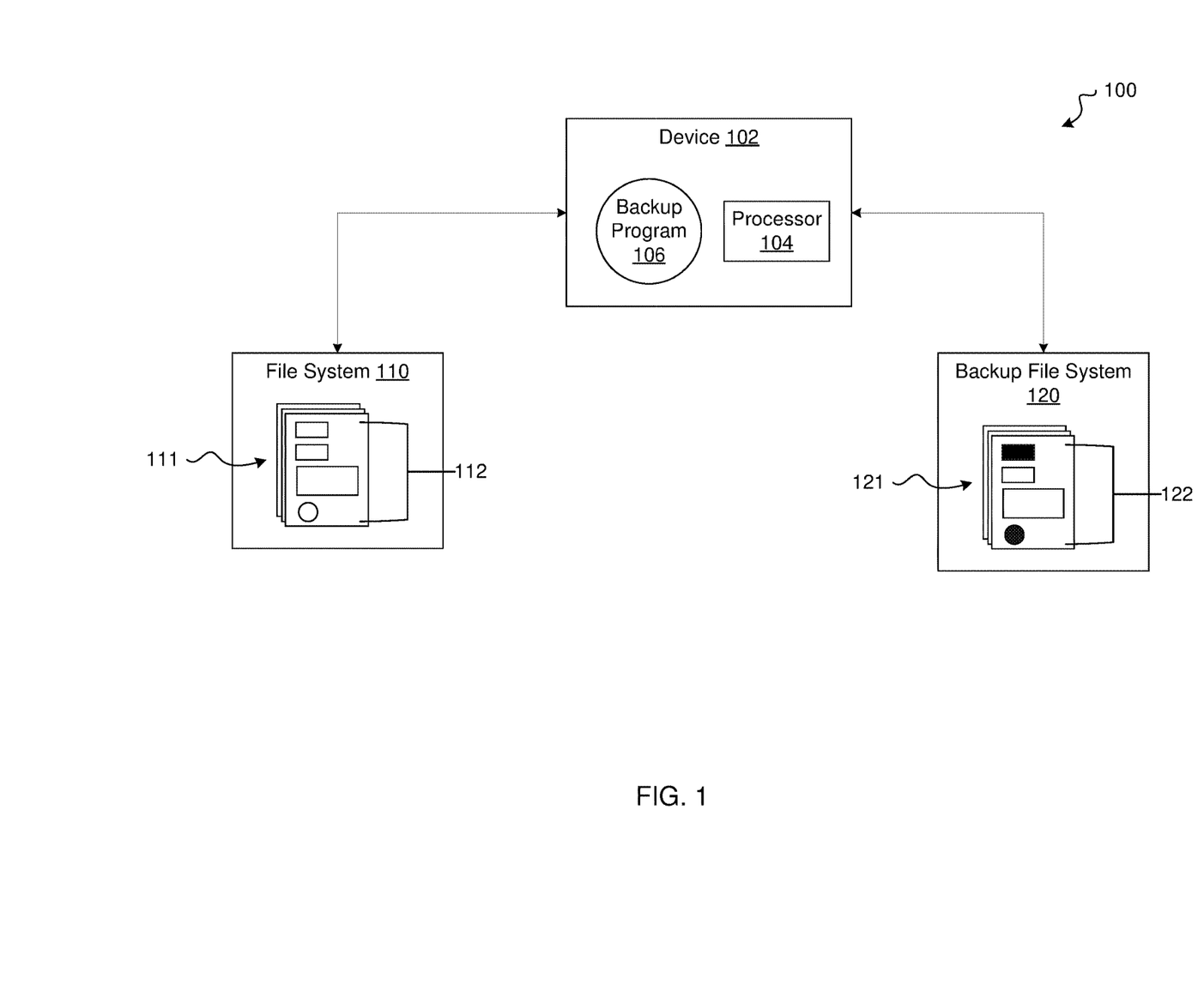
FIG. 1 is a block diagram of a computing environment 100 for managing electronic backups of data stored on one or more tangible storage devices, according to an embodiment of the invention.

FIG. 1 is a block diagram of a computing environment 100 for managing electronic backups of data stored on one or more tangible storage devices, according to an embodiment of the invention. Computing environment 100 includes computing device 102, file system 110, and backup file system 120. Components in computing environment 100 are interconnected. File system 110 and backup file system 120 may be connected to device 102 locally or remotely.

Device 102 is an electronic computing device, and includes a computer processor 104 for processing programming instructions, such as instructions of backup program 106. Backup program 106 is a computing program that generally functions to perform data backup operations between file system 110 and backup file system 120. Backup operations include, without limitation: receiving a selection of files and directories; identifying changes in files and directories; transferring all parts or some parts of files and directories between two file systems; adding, removing, replacing, updating, or duplicating files or directories; generating logs and reports; providing notifications; providing a user interface; and other functions.

File system 110 is a computer-implemented file system deployed on one or more tangible storage devices, and operatively connected to device 102. File system 110 stores one or more electronic data files 111. Data files 111 include any electronic data file that can be stored on a tangible storage device, and include one or more data elements 112. Data elements 112 are the content stored in a data file 111, and define the data file's type. Data elements 112 include primary data, and may further include associated metadata. Primary data is the data for which the data file is created, and for which the data file is consumed by a user or process, and metadata defines aspects of the primary data, or otherwise facilitates the primary data's processing. Both primary data and metadata may have features. Data features refer to any feature, attribute, or characteristic of the data that can be identified, measured, analyzed, or otherwise processed. Data features can be defined and grouped for various purposes, such as for flagging a file for exclusion from a backup operation.

For example, a primary data file may be a text file generated by a word processing application. A user may open the text file to display its contains o a display device, or print the file using a printer. Metadata associated with the text file may include identifying information, the date and time the text file was created or modified, various fonts, sizes, and margins used to display the text, or other information. Non-limiting examples of additional file types include other text files (for example, a spreadsheet file), image files, audio files, video files, or hypertext markup language (HTML) files. Additional file types are expressly contemplated by embodiments of the invention.

In one example, the primary data or metadata for a file may include features categories as "confidential", and may cause the corresponding primary data, metadata, or the particular feature, to be excluded from a backup operation. Examples of data features that may cause the data to be classified as confidential are: sensitive personal information (SPI), selective facial recognition (for example, images of children or pets), and geographic location (for example, a particular vacation spot). Data may be analyzed to detect the presence of such confidential information. Embodiments of the invention may treat this data differently, or cause this data to be treated differently, as part of a data backup operation.

Computing environment 100 also includes a backup file system 120. Backup file system 120 is a computer-implemented file system deployed on tangible storage device operatively connected to device 102 and file system 110. Backup file system 120 may be a local or remote file system relative to device 102 and file system 110. In a local configuration, file system 110 may be locally connected to backup file system 120 via a physical connection, a short-range wireless communication technology, or a wired/wireless network. In the local configuration, backup file system 120 is typically transparent to device 102; device 102 has some control over backup file system 120. In a remote configuration, on the other hand, backup file system 120 is typically hidden from device 102. Device 102 behaves as a client device connecting to a remote server; in this configuration, the server moderates data transfers between device 102 and backup file system 120, without necessarily releasing any information about backup file system 120 to device 102. The server may be a server device operated by a cloud storage provider. The cloud storage provider maintains backup file system 120. Where and how the data files are stored on backup file system 120 are hidden from file system 110.

Generally, a given file 111, or a given set of data elements 112 in the file, may be excluded from backup operation if at least one feature of the give file or the given set of data elements matches a predefined exclusion feature. A predefined exclusion feature refers to an feature that is defined (for example, in a definitions file) so as to trigger a backup exclusion process. In an embodiment, exclusion feature definitions are user-defined. Some illustrative and non-limiting examples of exclusion features are as follows. Files or data elements may be defined as having an exclusion feature if they are determined to contain account access credential (for example, username, password, security question/answer, pin code, or bank account number); personal identifying information (for example, social security number, birthday); regulated data (for example, medical and financial records); in the case of videos or images, predefined pixel patterns (for example, in an image, where the number of pixels having a predefined color range exceed a threshold percentage of the total pixels in the picture, or if the pixels match a predefined pattern including a face or other body part).

Backup file system 120 includes backup files 121 having data elements 122. Generally, backup files 121 stored on backup file system 120 may include versions of files 111 stored on file system 110. In an embodiment, backup files 121 may be identical to files 111. In another embodiment, backup files 121 may include all files 111 except those excluded from a backup operation, where some files are excluded from backups on backup file system 120 based on their content. In yet another embodiment, backup files 121 may include modified versions of files 111, where one or more data elements 122 in backup files 121 are modified or redacted versions of corresponding data elements 112 in files 111. Redacting or otherwise modifying data elements of a file varies depending on embodiments of the invention, but generally refers to redacting, modifying, or removing data elements in the file. For example, device 102 may redact certain data elements 112 in a file 111 by removing them from file 111, to generate a corresponding file 121. As another example, device 102 may superimpose a black bar on an area of an image file that triggers the redaction process.

Additional details of the physical structure, properties, and configurations of file system 110 and backup file system 120 are described in connection with FIGS. 6-8, below, in which device 102 may be a cloud computing node, and may function as a client device, a server device, or both. Additional details of backup operations relating to these components are described in connection with flowcharts depicted in FIGS. 2-5, below.

Figure 2:
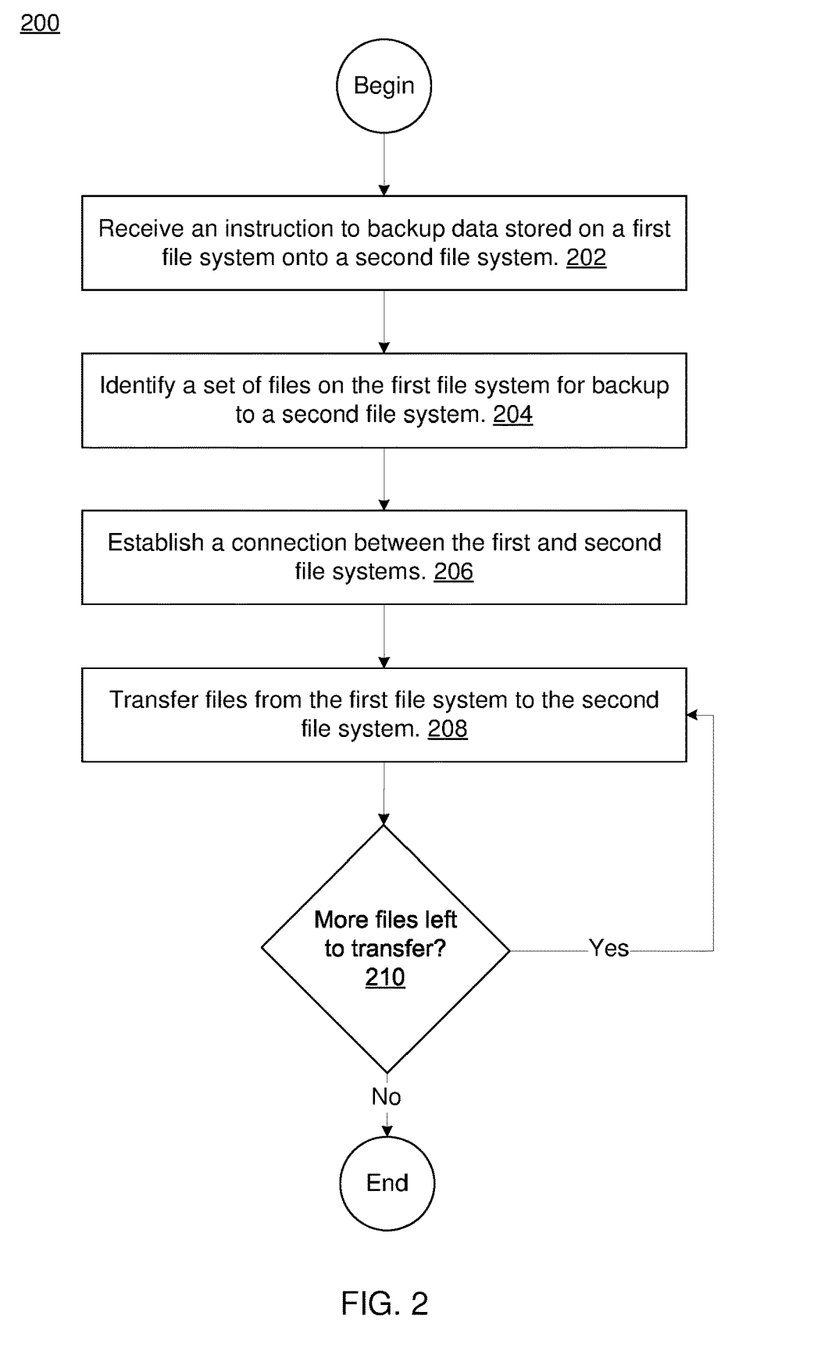
FIG. 2 is a flowchart of a method for performing a data backup operation in the computing environment of FIG. 1, according to an aspect of the invention.

FIG. 2 is a flowchart of a method 200 for performing a data backup operation in computing environment 100 (FIG. 1), according to an aspect of the invention. Steps of method 200 may be performed using processor 104 of device 102. The particular order in which these steps are presented and described are for illustration only; they may be performed in any order, or concurrently, without departing from the spirit or scope of the invention.

Referring now to FIGS. 1 and 2, device 102 receives an instruction (step 202) to backup data that is stored on a first file system, such as file system 110, onto a second file system, such as backup file system 120. In an embodiment, the instruction is received based on a user action. For instance, a user selects a file that is stored on the user's personal computer or mobile device, for backup (also called an upload operation), using a transfer interface provided by a cloud storage service provider. The interface may be, for example, a web-based portal, a mobile application, or a native operating system interface. These interfaces may be graphical or text-based. The user's selection causes an instruction to be communicated to device 102 to initiate a backup operation. In another embodiment, the instruction is generated automatically according to a backup schedule, where device 102 periodically initiates a backup process according to the backup schedule. In another embodiment, the instruction is generated automatically based on occurrence of a trigger event, such as an addition of a file or a directory to a backup directory, or a modification or removal of a file or directory designated for backup.

Device 102 identifies the file (one or more files and/or directories) associated with the received instruction (step 204), and designates them for backup. Designating a given file for backup may be implemented by, for example, adding the file's identifying information (such as its name and file path) to an electronic list of files/directories to be backed up. Where the user initiates the backup process, the user may select the files to be backed up, at the time the user initiates the process, or at another time. For example, the user may highlight a set of files using a graphical user interface, and activate a button to initiate the backup process. Other selection methods are possible. Where the backup is performed according to an automatic backup schedule, program 106 may consult a pre-defined selection of files and directories that are designated for backup.

Device 102 establishes an operative connection between file system 110 and backup file system 120 (step 206). Device 102 may establish and maintain a direct connection with backup file system 120, or may connect to backup file system 120 via one or more intermediary devices, such as a remote server. As such, device 102 may, in some embodiments, have no information regarding backup file system 120; device 102 merely communicates the data to be backed up to the remote server, and it is the remote server that handles the transfer of the data to backup file system 120.

Device 102 transfers one or more files/directories, selected for backup, from file system 110 to backup file system 120 (step 208). As the transfer continues, program 106 determines whether there are additional files in the selected set that have yet to be transferred (decision step 210). If additional files are left ("Yes" branch), program 106 continues with the transfer process (step 208). Otherwise ("No" branch), program 106 ends the backup process.

It should be noted that although discussions of embodiments of the invention have, in some instances, described device 102 as a client device, device 102 may be, in other embodiments, a server device. That is, a server device, rather than a client device, can perform some or all functions ascribed to device 102, without departing from the spirit or scope of the invention.

Figure 3:
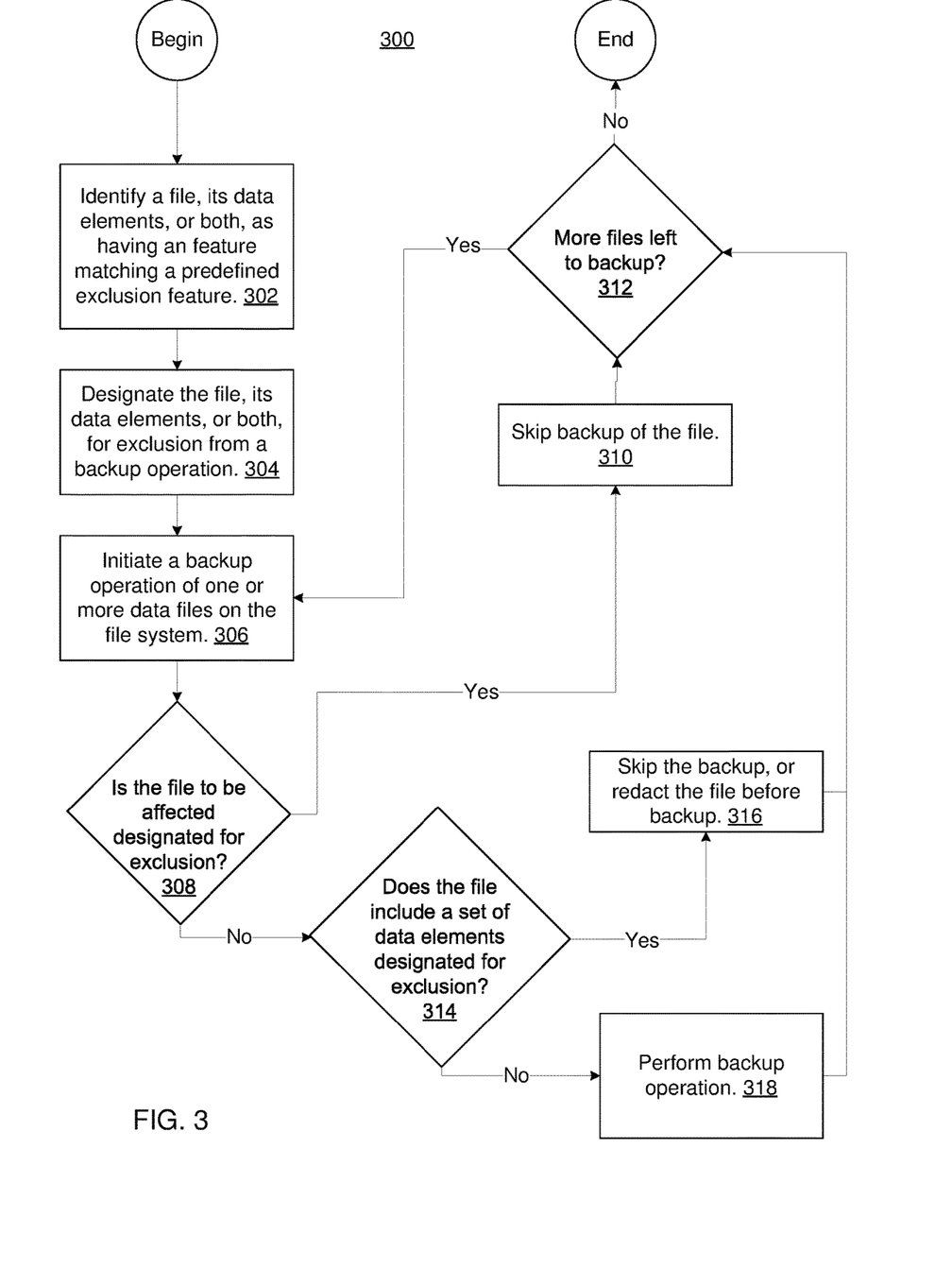
FIG. 3 is a flowchart of a method for identifying an electronic data file for exclusion from a data backup operation, according to an aspect of the invention.

FIG. 3 is a flowchart of a method 300 for identifying an electronic data file for exclusion from a data backup operation, according to an aspect of the invention. In one example, steps of method 300 are implemented in computing environment 100 (FIG. 1) as instructions of program 106, executed by processor 104, to exclude a file 111 stored in file system 110 from a backup operation performed according to method 200 (FIG. 2) to backup files on backup file system 120.

Referring now to FIGS. 1 and 3, device 102 identifies (step 302) either or both of a first data file 111 stored on file system 110, and a set of data elements 112 within the first data file, where either or both of the first data file 111 and the set of data elements 112 within the first data file have at least one feature matching a predefined exclusion feature. This step may be performed as part of a backup process, or an independent process (such as a periodically executed daemon process, or a user-initiated process). The designation may be applied to a file as a whole, or to individual components of the file that match a predefined exclusion feature.

In one example, a user creates a directory and adds several files to that directory. The user initiates the identification process (step 302) via a user-interface. Device 102 analyzes the files in the directory to determine whether any of the files or any of their data elements have an feature matching a predefined exclusion feature.

An illustrative exclusion feature may be designed to identify, and to exclude from backups, image files that depict a human figure in a particular state of dress. The given exclusion feature may be an aggregated set of individual features associated with the image, and may be defined, for example, as "an image having pixels determined to depict a person, where the number of pixels matching an identified skin tone of the person exceed 20% of the total number of pixels determined to depict the person". In this example, whenever data elements (i.e., pixels) in an image are identified as depicting a person, and more than 20% of those pixels are determined to show the person's skin, the image may be tagged as inappropriate for backup.

Another illustrative exclusion feature may be designed to identify, and to exclude from backups, files containing social security numbers; the social security number is the exclusion feature. A social security number can be defined as a text stream having the pattern "###-##-####". Device 102 processes a set of files. If any file contains a social security number, device 102 flags the file and/or the specific part of the file containing the social security number as having an feature that matches a predefined exclusion feature.

With continued reference to FIGS. 1 and 3, device 102 designates either or both of the first data file 111 and the set of data elements 112 within the first data file for exclusion from a backup operation (step 304), based on the identification (step 302). The designation ensures that during data backup operations, the operations can be performed by taking the sensitivity of the file and/or its data elements into consideration.

Device 102 optionally initiates a backup operation of one or more data files 111 on file system 110 (step 306; the backup operation may be independent of the identifying and designating functions of method 300; that is, method 300 may be practiced without initiating a data backup operation).

For a given file under consideration for backup (at step 306), device 102 determines (decision step 308) whether the file is designated for exclusion from a backup operation (the designation is performed at step 304). If the file is designated for exclusion ("Yes" branch), such as may be the case when the file contains sensitive material, device 102 skips (step 310) the backup operation of the file. For example, if the file is newly added to a directory that is typically backed up upon modification, device 102 skips the newly added file in performing its backup operations. If device 102 skips the backup (step 310), it determines whether there are additional files to be backed up (step 312). If there are more files left to back up ("Yes" branch), device 102 repeats initiation of a backup operation for another file (step 306). If there are no more files to be backed up ("No" branch), the process terminates.

For a given file under consideration for backup (at step 306), if device 102 determines (decision step 308) that the file as a whole is not designated for exclusion from a backup operation ("No" branch), device 102 determines (decision step 314) whether the file nevertheless includes data elements that are designated for exclusion. If the file does not include such data elements ("No" branch), device 102 performs the data backup operation (step 318) and checks for more files to be processed (decision step 312) as before. However, if the file does include such data elements ("Yes" branch), device 102 either skips the backup operation for the entire file or redacts/removes/modifies the data element designated for exclusion (step 316), and moves on to check for more files (step 312). Redacting, removing, or otherwise modifying a file varies depending on embodiments of the invention.

Referring now generally to FIGS. 1-3, according to an embodiment of the invention, detecting a designation of data elements in a given file for exclusion from a backup operation causes the entirety of the given file to be excluded. In another embodiment, a redacted version of the file is backed up.

According to an embodiment of the invention, some files under consideration for processing by device 102 have no backup associated with them prior to such processing, while others have previous backups associated with them. In the case where previous backups exist, a determination by device 102 that no backup should exist, or that only a redacted backup should exist, causes a change in the previous backup so as to either remove the backup, or to replace it with a modified/redacted version.

According to an embodiment of the invention, a user interface may be provided whereby a user defines various exclusion features. The user also may select them from a list of predefined exclusion features.

According to an embodiment of the invention, the process of redaction includes replacing a data element with a substitute element (for example, a word that triggers the exclusion may be replaced with a neutral word).

According to an embodiment of the invention, device 102 may perform optical character recognition (OCR) operation on at least a portion of a file 111 to identify text in the file (which may not have been identifiable as text prior to the OCR operation).

Figure 4:
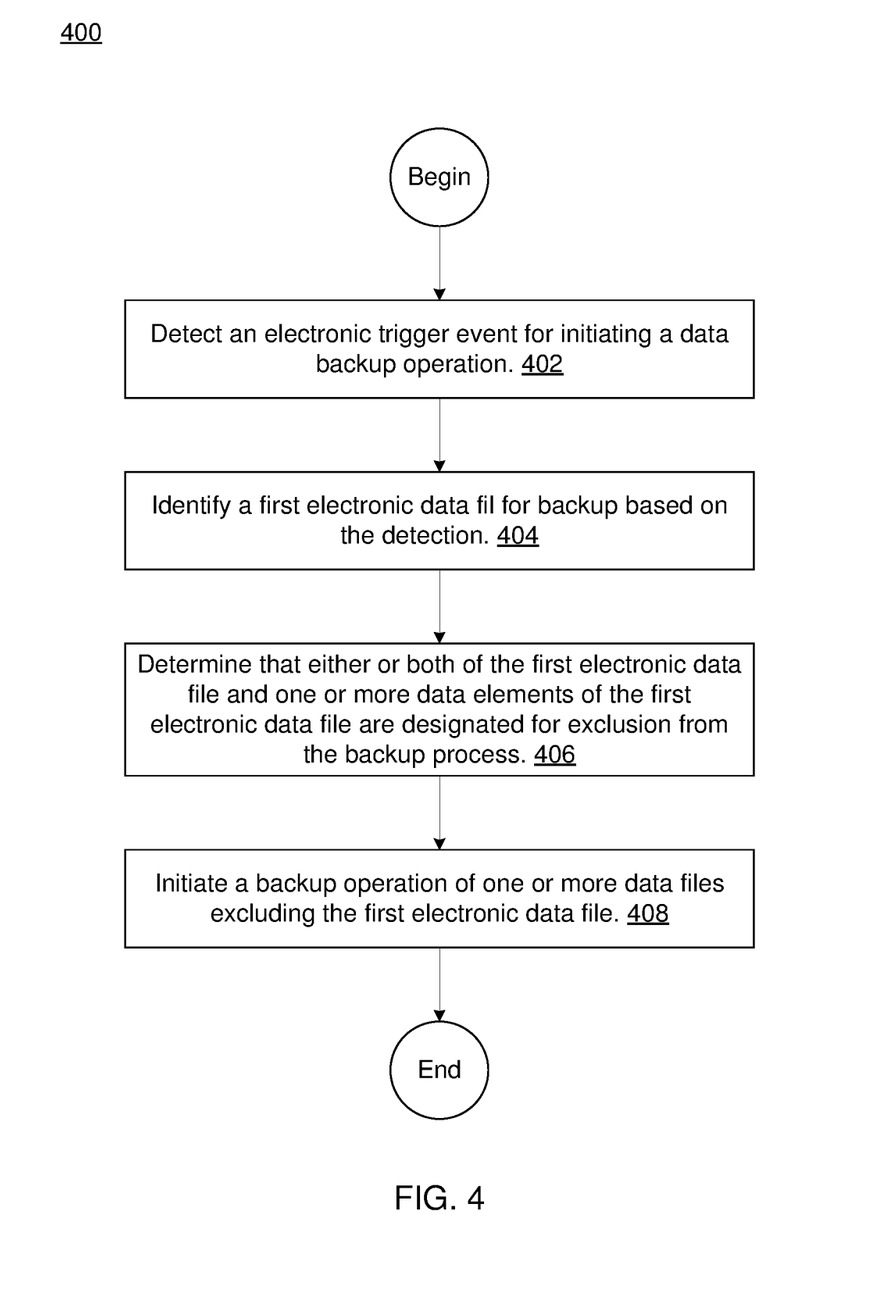
FIG. 4 is a flowchart of a method for backing up electronic data files, in the computing environment of FIG. 1, according to an embodiment of the invention.

FIG. 4 is a flowchart of a method 400 for backing up electronic data files in the computing environment 100 (FIG. 1), according to an embodiment of the invention. Steps of method 400 may be implemented as instructions of program 106 and executed by processor 104, to perform backup operations on backup files 121 stored on backup file system 120, based on files 111 stored on file system 110. According to an embodiment, device 102 may be a client device or a server device. In either case, device 102 may be a cloud-computing node.

Referring now to FIGS. 1 and 4, device 102 detects an electronic trigger event (step 402) for initiating a data backup operation. The trigger event may be a user-initiated event or an automatically generated event. In either case, the trigger event may be, for example, a modification to a data file, creation of a new data file in memory, a change in a location of a data file in memory, or a deletion of a data file from memory.

Device 102 identifies (step 404) a first electronic data file for backup, based on the detection (step 402). Device 102 determines that either or both of the first electronic data file and one or more data elements of the first electronic data file are designated for exclusion from the backup process (step 406). The designation is performed as described in connection with method 300 (FIG. 3).

Device 102 initiates a backup operation (step 408) of one or more data files excluding the first electronic data file, at least in its original form. That is, device 102 either does not backup the first electronic data file, or backs up a modified form of it. Modified forms of the first electronic data file include, for example, a redacted version, a version in which at least one of the one or more data elements are replaced with another data element, and a version excluding the one or more data elements that are tagged for exclusion.

According to various embodiments, initiating a backup operation includes transferring at least one data file, updating at least one data file, or removing at least one data file. Performing a data backup operation may include establishing a network connection by a client computer with a cloud-computing node; and transferring a data file to the cloud computing-node, communicating to the cloud computing-node an instruction to remove a data file, or communicating to the cloud computing-node an instruction to update a data file.

Figure 5:
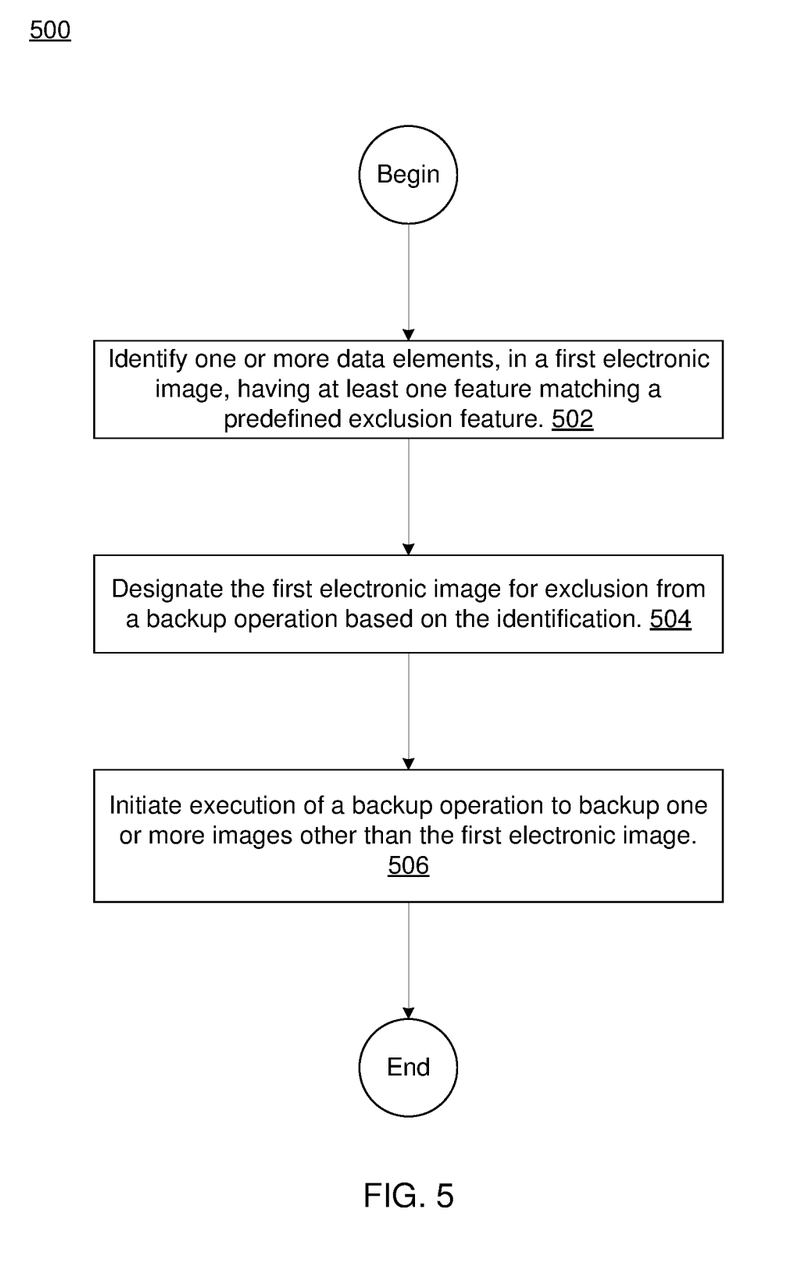
FIG. 5 is a flowchart of a method for providing electronic image security on a mobile device, according to an embodiment of the invention.

FIG. 5 is a flowchart of a method 500 for providing electronic image security on a mobile device in computing environment 100 (FIG. 1), according to an embodiment of the invention. Device 102 may be, in this embodiment, a mobile device having a camera component configured to capture digital images storable on file system 110. Each file 111 may be an image, and each data element 112 may be a pixel, set of pixels, or other primary data or metadata associated with a given image file 111. Backup file system 120 may be part of a cloud-computing network having data storage functions.

Referring now to FIGS. 1 and 5, device 102 may store an image on file system 110. The image may be captured using a camera of device 102, or may otherwise be received via any known communication mechanism known in the art (for example, via email, text, or other file transfer tool or protocol).

Device 102 identifies (step 502) one or more data elements in the received image as having at least one feature matching a predefined exclusion feature, as described above. For example, an image may have a pixel pattern matching a predefined pattern. In an embodiment, the pixel pattern defines the shape of a human person, and a frequency of a pixel pattern associated with all or parts of the person exceeds a threshold value. In a related embodiment, the pixel pattern defines a human facial pattern in general, or the facial pattern of a specific person. In this manner, images of a person, or those images showing a specific person, can be exclude from backup. In a related embodiment, a pixel pattern indicative of a person's age may be used as a exclusion feature (for example, a user may protect the privacy of the user's children by excluding their images from backups).

Based on the identification, device 102 designates (step 504) the image for exclusion from a backup operation. That is, device 102 will not backup the image if a copy does not already exist on backup file system 120. Device 102 may initiate execution of a backup operation (step 506) of one or more images other than the first image. In a related embodiment, if a copy exists, device 102 may cause that copy to be removed (for example, by communicating a removal instruction to the server controlling backup file system 120). Whether or not a copy exists, device 102 may cause a modified image to be backed up to backup file system 120, where some or all tagged data elements are removed, replaced, or redacted. For example, if the data elements include names of persons who appear in the photo (stored as metadata associated with the image), the names may be removed from the version of the image on the backup file system 120.

Referring now generally to FIGS. 1-5, according to an embodiment of the invention, device 102 may present a user with an interface by way of which the user can select a file or features within a file for exclusion. Device 102 builds a data model using features of the file, or the selected features, to train a model of confidential data. Through successive iterations, the user may train this data model such that device 102 can automatically detect confidential data, and to exclude the confidential data from a backup operation. For example, the user can train device 102 to exclude from backup operations any pictures depicting the user's children; this may be useful, for example, where the user wishes to maintain the children's privacy. The same process may be used to identify geographical location, sensitive personal information, or nudity in the data features, and to exclude the data features or the entirety of the files in which they are contained, from a backup operation.

Figure 6:
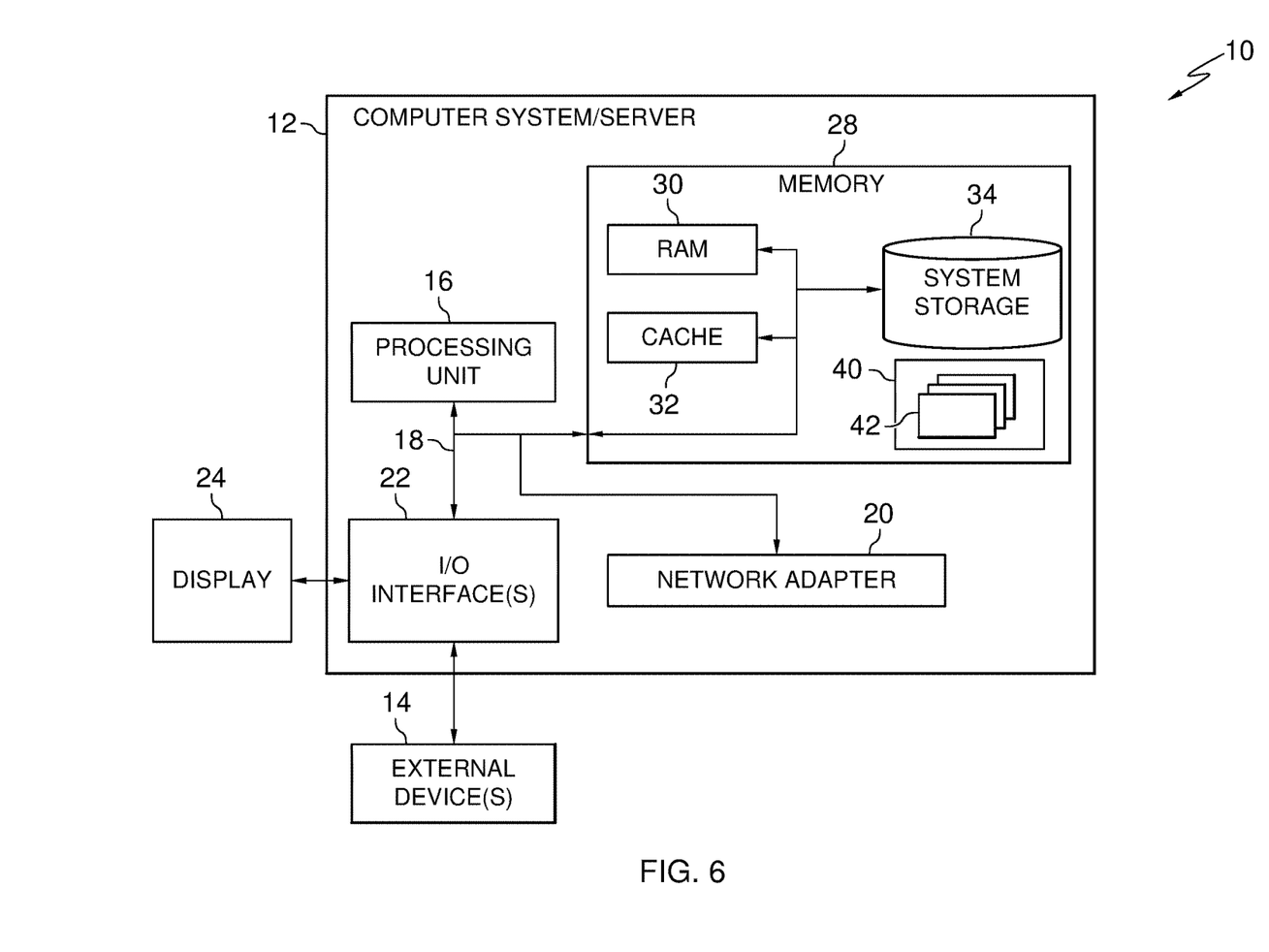
FIG. 6 is a block diagram of a computing device, according to an embodiment of the invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
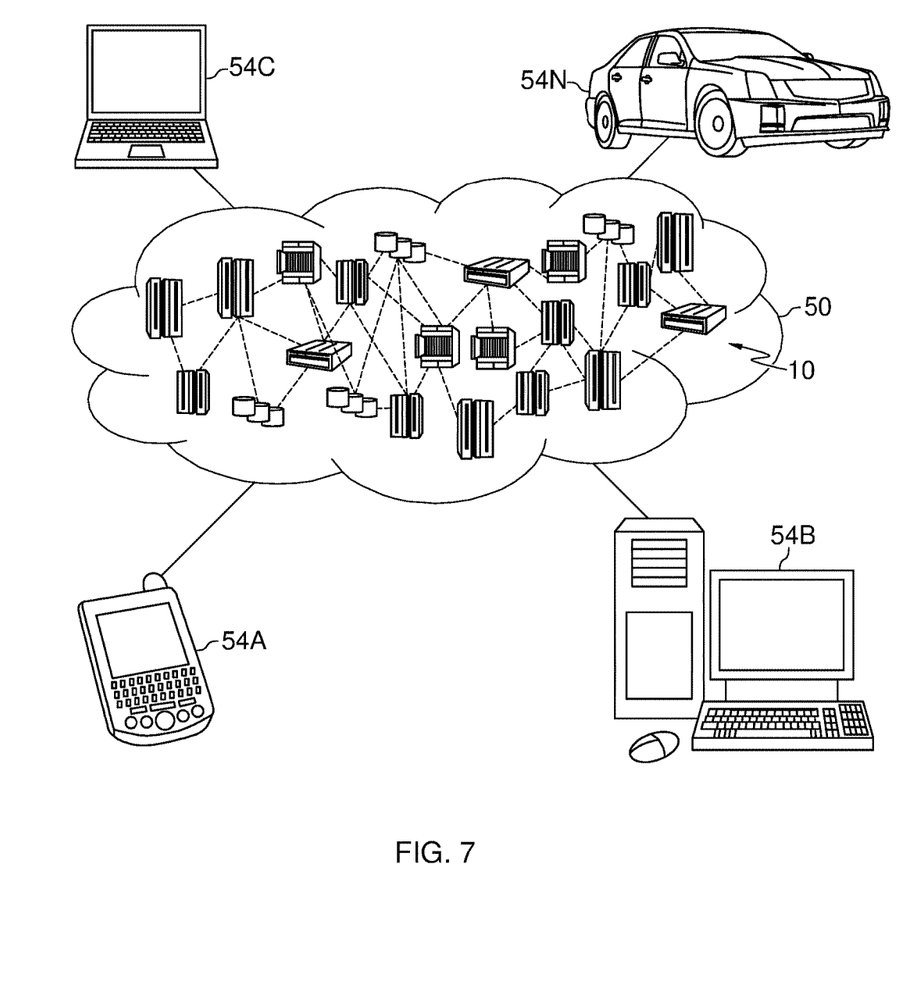
FIG. 7 is a block diagram of an illustrative cloud computing environment, according to an aspect of the invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that cloud computing nodes 10 and cloud computing environment 50 can communicate with any type of computerized device over any type of network and/or network addressable connection (e.g., using a web browser).

Figure 8:
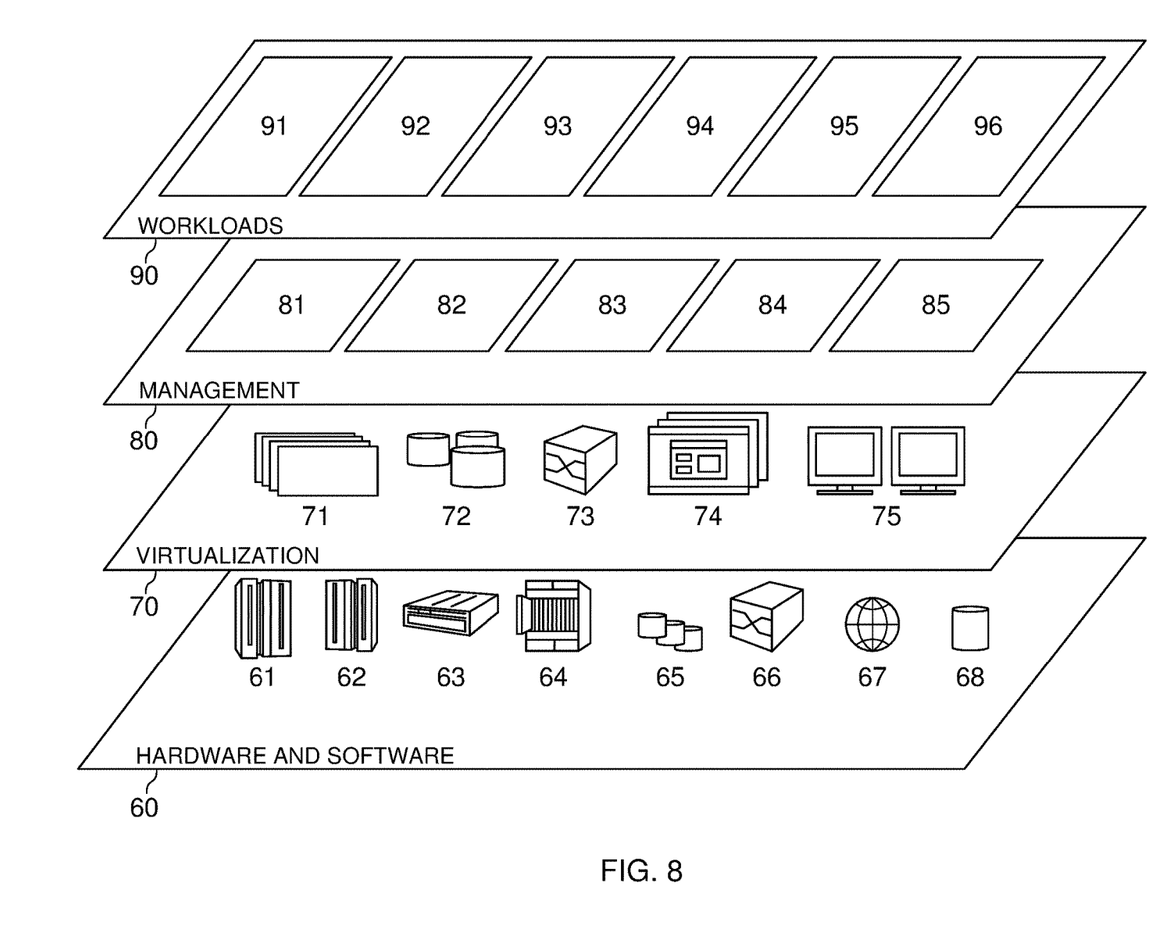
FIG. 8 is a block diagram of functional layers of the illustrative cloud computing environment of FIG. 7, according to an aspect of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; backup operations 96, including those described in connection with FIGS. 1-5. This is for illustration purposes only. In some embodiments, backup operations 96 may be performed by other components, such as those in management layer 80 and virtualization layer 70.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for backing up electronic data files, comprising:
    detecting an electronic trigger event for initiating a data backup operation;
    identifying a first electronic data file for backup based on the detection;
    determining that either or both of the first electronic data file and one or more data elements of the first electronic data file are designated for exclusion from the backup process, wherein designation for exclusion is based at least in part on identifying, in the first electronic data file or the one or more data elements of the first electronic data file, confidential data; and
    initiating a backup operation of one or more data files excluding the first electronic data file and any of the one or more data elements of the first electronic data file.

2. The method of 1, further comprising:
    backing up a modified version of the first data file, wherein the modified version is defined relative to the first data file to be backed up.

3. The method of claim 2, wherein the modified version comprises at least one of:
    a redacted version of the first data file;
    a version of the first data file in which at least one of the one or more data elements are replaced with another data element; and
    a version of the first data file excluding the one or more data elements.

4. The method of claim 1, wherein initiating a backup operation of the one or more data files excluding the first electronic data file, comprises one or more of:

transferring at least one data file;
updating at least one data file; and
removing at least one data file.

5. The method of claim 1, wherein the electronic trigger event comprises at least one of:
   a modification to a data file;
   creation of a data file in memory;
   a change in a location of a data file in memory; and
   a deletion of a data file from memory.

6. The method of claim 1, wherein the data backup operation comprises:
   establishing a network connection by a client computer with a cloud-computing node; and
   transferring a data file to the cloud computing-node.

7. The method of claim 1, wherein the data backup operation comprises:
   establishing a network connection by a client computer with a cloud-computing node; and
   communicating to the cloud computing-node an instruction to remove a data file.

8. The method of claim 1, wherein the data backup operation comprises:
   establishing a network connection by a client computer with a cloud-computing node; and
   communicating to the cloud computing-node an instruction to update a data file.

9. The method of claim 1, further comprising:
   defining a set of exclusion features including the identified exclusion feature, where the defining comprises:
   receiving a selection of a plurality of features in one or more files from a user; and
   generating a data model based on the plurality of features, wherein the identifying is based, at least in part, on the data model.

10. A computer system for backing up electronic data files, comprising:
    one or more computer devices each having one or more processors and one or more tangible storage devices; and
    a program embodied on at least one of the one or more storage devices, the program having a plurality of program instructions for execution by the one or more processors, the program instructions comprising instructions for:
    detecting an electronic trigger event for initiating a data backup operation;
    identifying a first electronic data file for backup based on the detection;
    determining that either or both of the first electronic data file and one or more data elements of the first electronic data file are designated for exclusion from the backup process, wherein designation for exclusion is based at least in part on identifying, in the first electronic data file or the one or more data elements of the first electronic data file, confidential data; and
    initiating a backup operation of one or more data files excluding the first electronic data file and any of the one or more data elements of the first electronic data file.

11. The system of claim 10, wherein the program instructions further comprise instructions for:
    backing up a modified version of the first data file, wherein the modified version is defined relative to the first data file to be backed up.

12. The system of claim 11, wherein the program instructions further comprise instructions for:
    a redacted version of the first data file;
    a version of the first data file in which at least one of the one or more data elements are replaced with another data element; and
    a version of the first data file excluding the one or more data elements.

13. The system of claim 10, wherein initiating a backup operation of the one or more data files excluding the first electronic data file, comprises one or more of:
    transferring at least one data file;
    updating at least one data file; and
    removing at least one data file.

14. The system of claim 10, wherein the electronic trigger event comprises at least one of:
    a modification to a data file;
    creation of a data file in memory;
    a change in a location of a data file in memory; and
    a deletion of a data file from memory.

15. The system of claim 10, wherein the data backup operation comprises:
    establishing a network connection by a client computer with a cloud-computing node; and
    transferring a data file to the cloud computing-node.

16. A computer program product for backing up electronic data files, comprising a non-transitory tangible storage device having program code embodied therewith, the program code executable by a processor of a computer to perform a method, the method comprising:
    detecting, by the processor, an electronic trigger event for initiating a data backup operation;
    identifying, by the processor, a first electronic data file for backup based on the detection;
    determining, by the processor, that either or both of the first electronic data file and one or more data elements of the first electronic data file are designated for exclusion from the backup process, wherein designation for exclusion is based at least in part on identifying, in the first electronic data file or the one or more data elements of the first electronic data file, confidential data; and
    initiating, by the processor, a backup operation of one or more data files excluding the first electronic data file and any of the one or more data elements of the first electronic data file.

17. The computer program product of claim 16, wherein the method further comprises:
    backing up, by the processor, a modified version of the first data file, wherein the modified version is defined relative to the first data file to be backed up.

18. The computer program product of claim 17, wherein the modified version comprises at least one of:
    a redacted version of the first data file;
    a version of the first data file in which at least one of the one or more data elements are replaced with another data element; and
    a version of the first data file excluding the one or more data elements.

19. The computer program product of claim 16, wherein initiating a backup operation of the one or more data files excluding the first electronic data file, comprises one or more of:
    transferring at least one data file, by the processor;
    updating at least one data file, by the processor; and
    removing at least one data file, by the processor.

20. The computer program product of claim 16, wherein the electronic trigger event comprises at least one of:
 a modification to a data file;
 creation of a data file in memory;
 a change in a location of a data file in memory; and
 a deletion of a data file from memory.

\* \* \* \* \*